Patented Oct. 9, 1945

2,386,204

UNITED STATES PATENT OFFICE 2,386,204

SUBSTITUTED 1,3,5-TRIAZINYL-(6)-AMINO-PHENYL-ARSENIC COMPOUNDS

Ernst A. H. Friedheim, New York, N. Y.

No Drawing. Application December 9, 1941, Serial No. 422,234. In Switzerland December 10, 1940

10 Claims. (Cl. 260—242)

This invention relates to derivatives of triazines containing arsenic, and more particularly to triazine derivatives which contain trivalent arsenic.

In my U. S. Patent No. 2,295,574, issued on Sept. 15, 1942, I have shown that condensation of suitable derivatives of symmetric triazine with phenyl-arsonic acid derivatives results in a new type of condensation products possessing valuable therapeutic properties in diseases, caused by spirochaetes or trypanosomes, such as syphilis, and African sleeping sickness.

I have found that new triazine derivatives containing arsenic can be obtained by condensing derivatives of 1,3,5-triazine of the formula

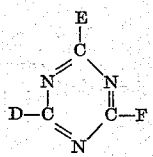

with an aromatic organic compound containing trivalent arsenic and corresponding to the formula $W-C_6H_2(A,B)-As=X$.

In these formulas, W is an amino-group or halogen. If W is an amino-group, at least one of the groups D, E, F is a halogen-group. If W is a halogen, at least one of the groups D, E, F is an amino-group. In both cases the other groups are selected from the group consisting of halogen, —NH₂, —NH alk., —N alk.₂, hydroxy-alkyl-amino,

dialkyl-amino-alkyl-amino—, and aminoacyl radicals, such as —NHCOCH₃ and —NHCOC₆H₅; it is to be understood that in the appended claims the term "amino-radicals" includes —NH₂ radicals as well as the before mentioned substituted amino-radicals; the radicals A and B are selected from the group consisting of hydrogen, halogen, OH, O alk., O acyl, NO₂, NH₂, NH alk., N alk.₂, aminoacyl, and alkyl radicals; X is a divalent group selected from the group consisting of O, S, dihalides, such as Cl₂, I₂ or Br₂, and sulfur-containing radicals of the type $=(S-R)_2$ wherein R is an organic radical which is capable of carrying an SH— radical. Such sulfur-containing reactants are, for example, thioglycollic acid, cysteine, or glutathione, thiophenol. As examples of the trivalent arsenic compounds to be used according to my invention, the following may be mentioned: 4-amino-phenylarsinoxide, 4-chlor-phenylarsinoxide, 4-amino-phenylarsindichloride, 4-amino-phenylarsinsulfide, 3-amino-4-oxy-phenylarsinoxide.

The condensation products thus formed have the formula

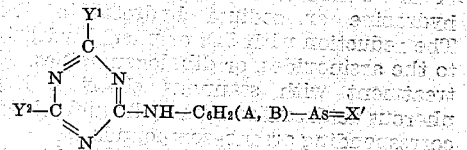

wherein $Y^1$ and $Y^2$ are each a radical selected from the group consisting of halogen, NH₂, NH alk., N alk.₂, hydroxy-alkyl-amino

dialkyl-amino-alkyl-amino, and aminoacyl radicals; A and B are selected from the group consisting of hydrogen, halogen, OH, O alk., O acyl, NO₂, NH₂, NH alk., N alk.₂, amino-acyl, and alkyl radicals, and X' is a divalent radical selected from the group consisting of O, S, dihalides, sulfur-containing groups of the type $=(S-R)_2$, wherein R is an organic radical which is capable of carrying an SH— radical, and groups having the formula

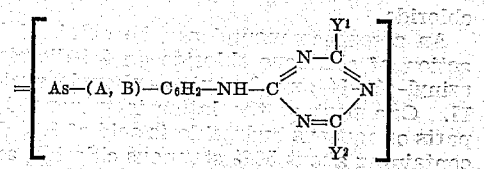

In carrying out the present invention, for example, an aqueous solution containing one mol of 4-oxy-3-amino-phenylarsinoxide may be caused to react with a fine suspension of 1 mol of 2,4,6-trichloro-1,3,5-triazine in water at a temperature of 0° C. with the exclusion of oxygen. The resulting condensation product has the formula

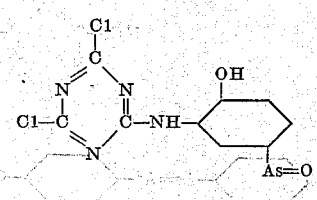

Subsequently, this reaction product may be treated with a base selected from the group consisting of ammonia, alkyl amines, hydroxy-alkyl amines and dialkyl-amino-alkyl amines. Similar reactions may be obtained by using a dihalide such as 4-amino-phenylarsindichloride instead of 4-oxy-3-amino-phenylarsinoxide. Instead of the latter, its derivatives or isomers, such as, for instance, 2-oxy-4-amino-phenyl-arsinoxide, or 4-amino-3-oxy-phenylarsinoxide may also be used. In carrying out these reactions, instead of the trichloro-triazine other derivatives of 1,3,5-triazine corresponding to the formula referred to above may also be used.

I have further found that the condensation products according to this invention may also be obtained by first forming a condensation product of the type disclosed in my above mentioned U. S. Patent No. 2,295,574 from a derivative of 1,3,5-triazine and a substituted phenyl-arsonic acid, and converting the condensation product thus obtained, into a compound containing trivalent arsenic. I have found that such conversion can be performed without the disintegration of the basic triazinyl-aminobenzene structure by treating the triazinyl-aminobenzene-arsonic acid condensation product in hydrochloric acid solution, in the presence of hydriodic acid, with $SO_2$, hypophosphorous acid ($H_2PO_3$), or stannous chloride or in neutral or alkaline solution with phenylhydrazine or sodium hydrosulfite ($Na_2S_2O_4$). The reduction with $SO_2$ or phenylhydrazine leads to the arsinoxides, or dihalogenarsines, while the treatment with stannous chloride, hypophosphorous acid, and sodium hydrosulfite leads to the corresponding arseno-compounds.

For example, one part by weight of 2,4-diamino-1,3,5-triazinyl-(6)-[amino-3-oxy-4-phenylarsonic acid I] is dissolved at about 80° C. in 100 parts of hydrochloric acid of sp. gr. 1.19. To the clear, warm solution 1/50 part of sodium iodide is added, and a stream of $SO_2$ gas is allowed to pass through the solution. After a few minutes the solution becomes cloudy, and the hydrochloride of 2,4-diamino-1,3,5-triazinyl-(6)-oxyaminophenylarsindichloride separates out in crystalline form. It is soluble in ethyl alcohol from which it may be recrystallized. It is slightly soluble in acetone, and insoluble in chloroform, $CCl_4$ and benzene. The corresponding arsinoxide is formed by the action of alkali, such as dilute ammonia or sodium bicarbonate on the arsindichloride.

An arseno-compound can be obtained by the action of stannous chloride on 2,4-diamino-triazinyl-(6)-[4-oxy-3-amino-phenylarsonic acid I]. One part of the latter is suspended in 50 parts of aqueous hydrochloric acid of 1.19 density containing about 50% stannous chloride, and 1% of hydriodic acid. On gentle warming the substance goes slowly into solution, the reaction mixture taking a yellow color. It becomes cloudy, and on standing a yellow precipitate separates, which represents the hydrochloride of the bis 2,2'-4,4'-tetraaminotriazinyl 6-6'(3-3'-diamino-4-4-dioxyarseno-benzene) of the formula:

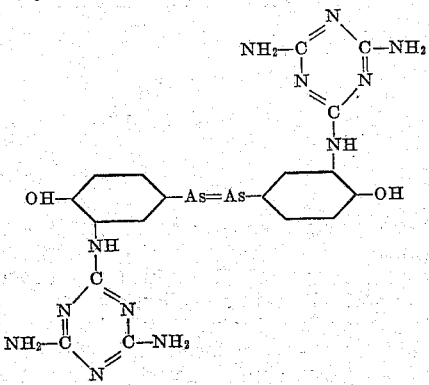

This compound is moderately soluble in dilute hydrochloric acid, and insoluble in ether and chloroform.

Other compounds according to my present invention may be obtained by applying the above described reduction processes to other arsonoanilino-triazine compounds, such as monochlormonoamino-arsono-anilino-triazine, and other arsono-anilino-triazine compounds obtained according to my above mentioned U. S. Patent No. 2,295,574.

As described in Example 2 of my above mentioned copending application, p-[2,4-dichloro-1,3,5-triazinyl-(6)]-aminophenylarsonic acid may be treated with ammonia in order to convert it into a 2-chloro-4-amino compound by covering said dichloro-compound with 10 times the quantity of 10% aqueous ammonia, and shaking at 45° C. for 1 hour, whereby the product goes into complete solution. By heating the [2-chloro-4-amino-1,3,5-triazinyl-(6)]-aminophenyl-arsonic compound in hydrochloric acid solution with $SO_2$, a compound having the formula:

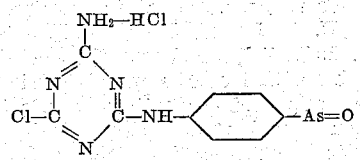

may be obtained.

I claim:

1. 1,3,5-triazine derivative of the formula

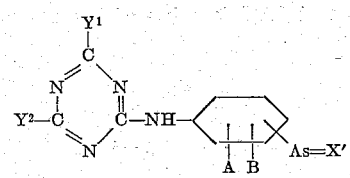

wherein at least one of $Y^1$ and $Y^2$ is an aminoradical, while the other is selected from the group consisting of halogen radicals and aminoradicals; A and B are selected from the group consisting of hydrogen, halogen, —OH, —O-alkyl, —O-acyl and alkyl radicals, and X' is a divalent radical selected from the group consisting of O, S, and dihalides.

2. 1,3,5-triazine derivative of the formula

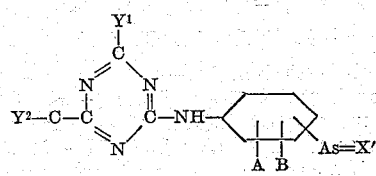

wherein $Y^1$ and $Y^2$ are amino radicals; A and B are selected from the group consisting of hydrogen, halogen, —OH, —O-alkyl, —O-acyl and alkyl radicals, and X' is a divalent radical selected from the group consisting of O, S, and dihalides.

3. p-(2,4-diamino-triazonyl-(6))-[4-oxy-3-amino-phenyldichlorarsin-I] of the formula

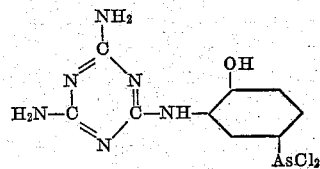

4. p-(2,4-diamino-triazonyl - (6) - [4 - oxy-3-amino-phenylarsinoxide-I] of the formula

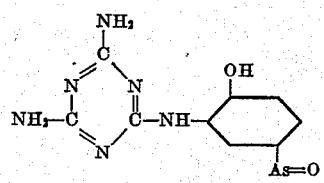

5. A process for the preparation of a 1,3,5-triazine derivative as claimed in claim 1, said process comprising subjecting in aqueous solution a 1,3,5-triazine derivative of the formula

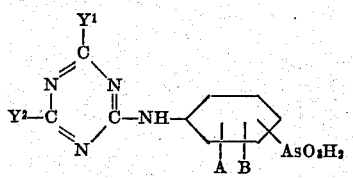

wherein at least one of $Y^1$ and $Y^2$ is an amino-radical while the other is selected from the group consisting of halogen radicals and amino-radicals; A and B are selected from the group consisting of hydrogen, halogen, —OH, —O-alkyl, —O-acyl and alkyl radicals, to the action of a reducing agent.

6. A process for the preparation of a 1,3,5-triazine compound of the formula

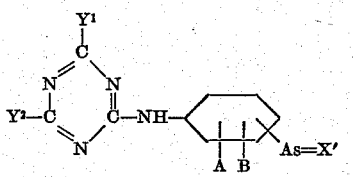

wherein at least one of $Y^1$ and $Y^2$ is an amino-radical while the other is selected from the group consisting of halogen radicals and amino-radicals; A and B are selected from the group consisting of hydrogen, halogen, —OH, —O-alkyl, —O-acyl, and alkyl radicals, and X' is a divalent radical selected from the group consisting of O, S, and dihalides, said process comprising subjecting said triazine compound to the action of $SO_2$ in the presence of hydrochloric acid and hydriodic acid.

7. p-(2,4-diamino-triazonyl - 6) - [4 - amino-phenylarsinoxide-I] of the formula:

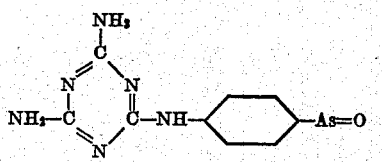

8. 1,3,5-triazine derivative of the formula

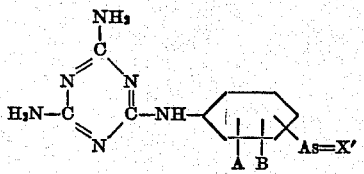

wherein A and B are selected from the group consisting of hydrogen, halogen, —OH, —O alkyl, —O acyl, and alkyl radicals, and X' is a divalent radical selected from the group consisting of O, S and dihalides.

9. 1,3,5-triazine derivative of the formula

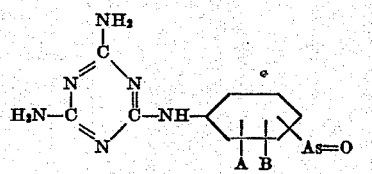

wherein A and B are selected from the group consisting of hydrogen, halogen, —OH, —O-alkyl, —O-acyl, and alkyl radicals.

10. 1,3,5-triazine derivative of the formula

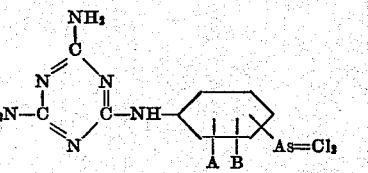

wherein A and B are selected from the group consisting of hydrogen, halogen, —OH, —O-alkyl, —O-acyl, and alkyl radicals.

ERNST A. H. FRIEDHEIM.